HARMAN S. PERKINS.
Improvement in Stone Loading Apparatus.
No. 124,852.  Patented March 19, 1872
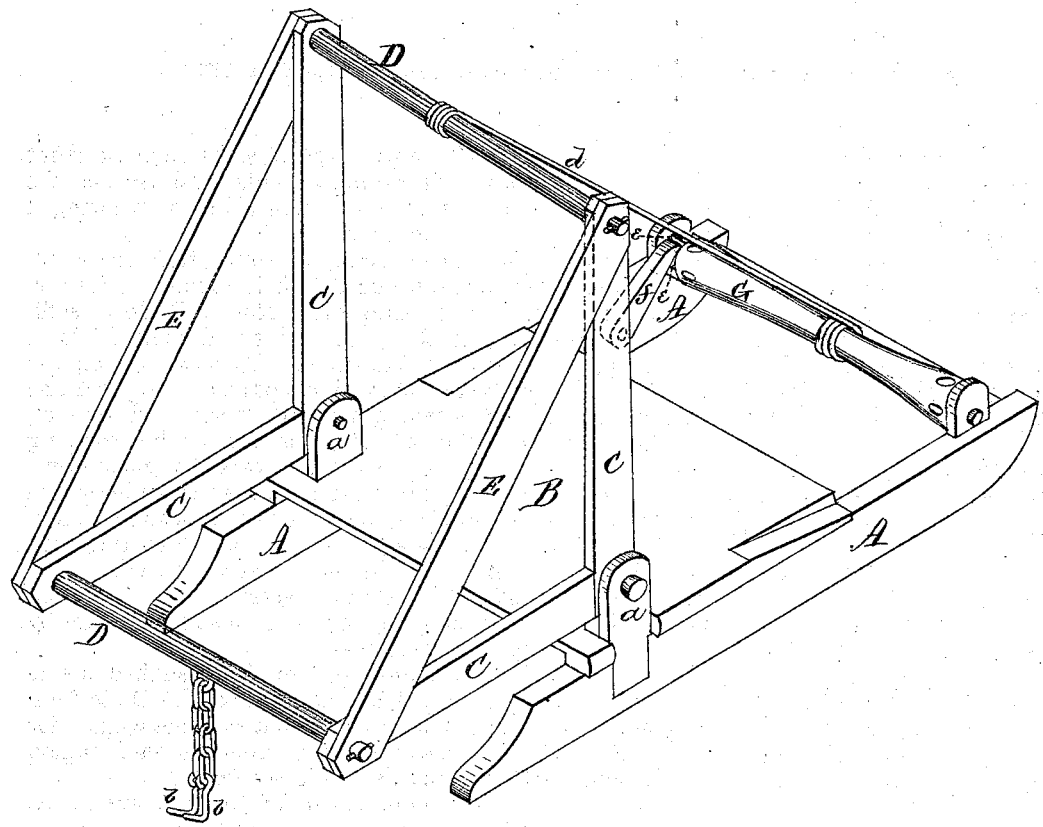

UNITED STATES PATENT OFFICE.

HARMAN S. PERKINS, OF RUTLAND, VERMONT, ASSIGNOR TO HIMSELF AND CHARLES H. ABBOTT, OF SAME PLACE.

IMPROVEMENT IN STONE-LOADING APPARATUS.

Specification forming part of Letters Patent No. 124,852, dated March 19, 1872.

SPECIFICATION.

*To all whom it may concern:*

Be it known that I, HARMAN S. PERKINS, of Rutland, in the county of Rutland and State of Vermont, have invented certain new and useful Improvements in Stone-Loading Machines; and I do hereby declare that the following is a full, clear, and exact description thereof, reference being had to the accompanying drawing and to the letters of reference marked thereon which form a part of this specification.

The nature of my invention consists in the construction and arrangement of a "stone-wagon," as will be hereinafter more fully set forth.

In order to enable others skilled in the art to which my invention appertains to make and use the same, I will now proceed to describe its construction and operation referring to the annexed drawing, which represents a perspective view of my stone-wagon.

A A represent the runners of my stone-wagon, which are suitably connected and provided with a platform, B, on top. From each runner A, through the platform, project two ears, $a$ $a$, between which is pivoted an L-shaped lever, C, the shorter end toward the rear and the longer toward the front. The ends of each of said L-shaped levers are connected by a brace, E, and the two levers are connected together at their extreme ends by bars D D', the former in front or at the longer ends, and the latter at the rear or shorter ends. From the rear cross-bar D' are suspended suitable chains and hooks $b$ $b$, for catching a rope or chain tied around the stone to be carried. A rope or chain, $d$, connects the front cross-bar D with a windlass, G, situated at the front ends of the runners. This windlass has the usual ratchet, $e$, and pawl, $f$, for preventing it from turning back.

The rope $d$ being unwound from the windlass G, the frame C D E is turned on its pivots so as to bring the cross-bar D' down sufficiently to allow the chains and hooks $b$ $b$ to be fastened to the stone. By now turning the windlass so as to wind up the rope $d$, the frame C D E is swung forward, raising the stone up higher than the platform B, and when the long arms of the L-shaped levers C C come down upon the platform the stone is suspended above said platform, and may be deposited in any place on the same; or it may be carried thus suspended to the place where wanted.

Having thus fully described my invention, what I claim as new, and desire to secure by Letters Patent, is—

1. The combination of the L-shaped levers C C, braces E E, and cross-bars D D', to form a frame to be pivoted to a suitable wagon, for the purpose of loading stone on said wagon, substantially as herein set forth.

2. The combination of the runners A A, platform B, frame C D E, chains and hooks $b$ $b$, rope $d$, and windlass G, with its ratchet-wheel $e$ and pawl $f$, all substantially as and for the purposes herein set forth.

In testimony that I claim the foregoing as my own I affix my signature in presence of two witnesses.

HARMAN S. PERKINS.

Witnesses:
   CHS. F. PERKINS,
   HENRY P. SISSON.